May 17, 1932.  H. J. WHITE  1,858,869
CUTTER SHARPENER
Filed Feb. 14, 1931   3 Sheets-Sheet 1

INVENTOR
Herbert J. White
BY
his ATTORNEY

May 17, 1932.   H. J. WHITE   1,858,869
CUTTER SHARPENER
Filed Feb. 14, 1931   3 Sheets-Sheet 2
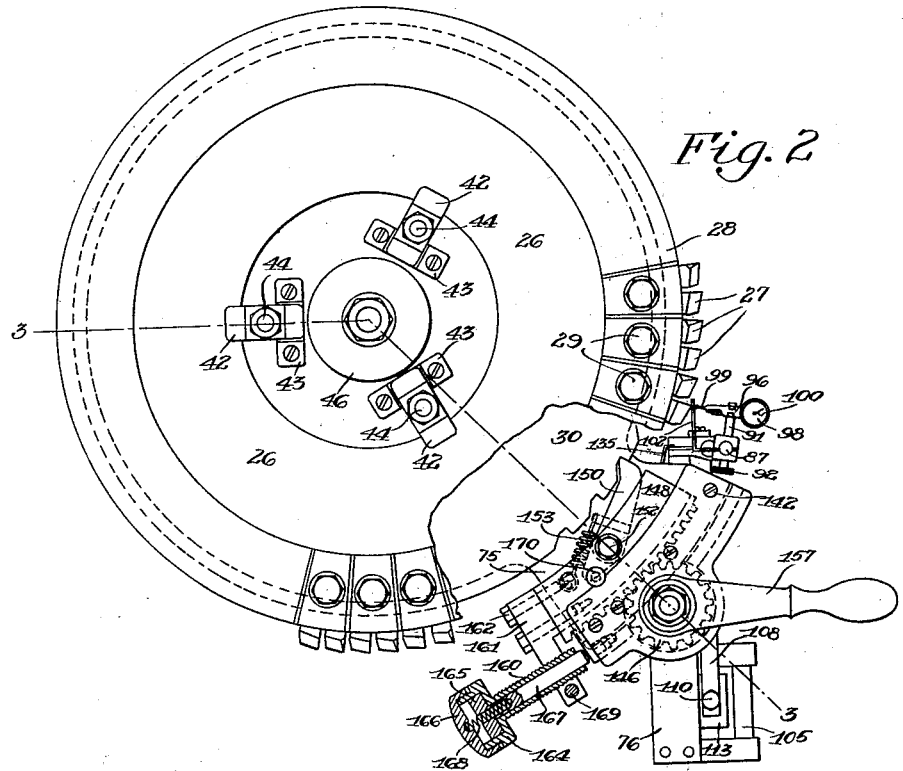
Fig. 2
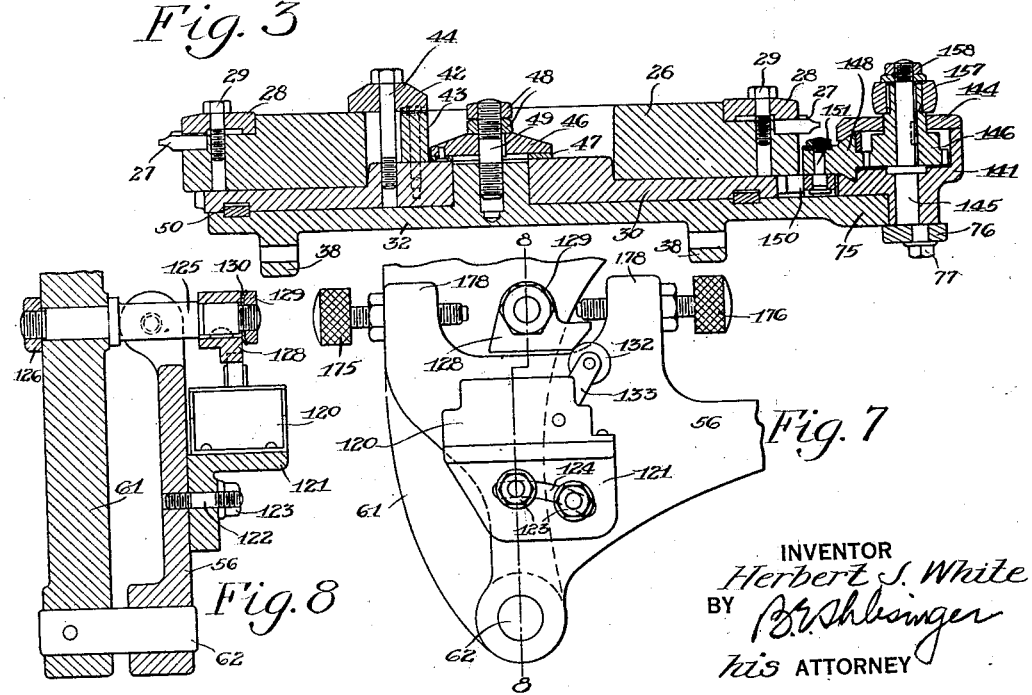
Fig. 3
Fig. 7
Fig. 8
INVENTOR
Herbert J. White
BY
his ATTORNEY

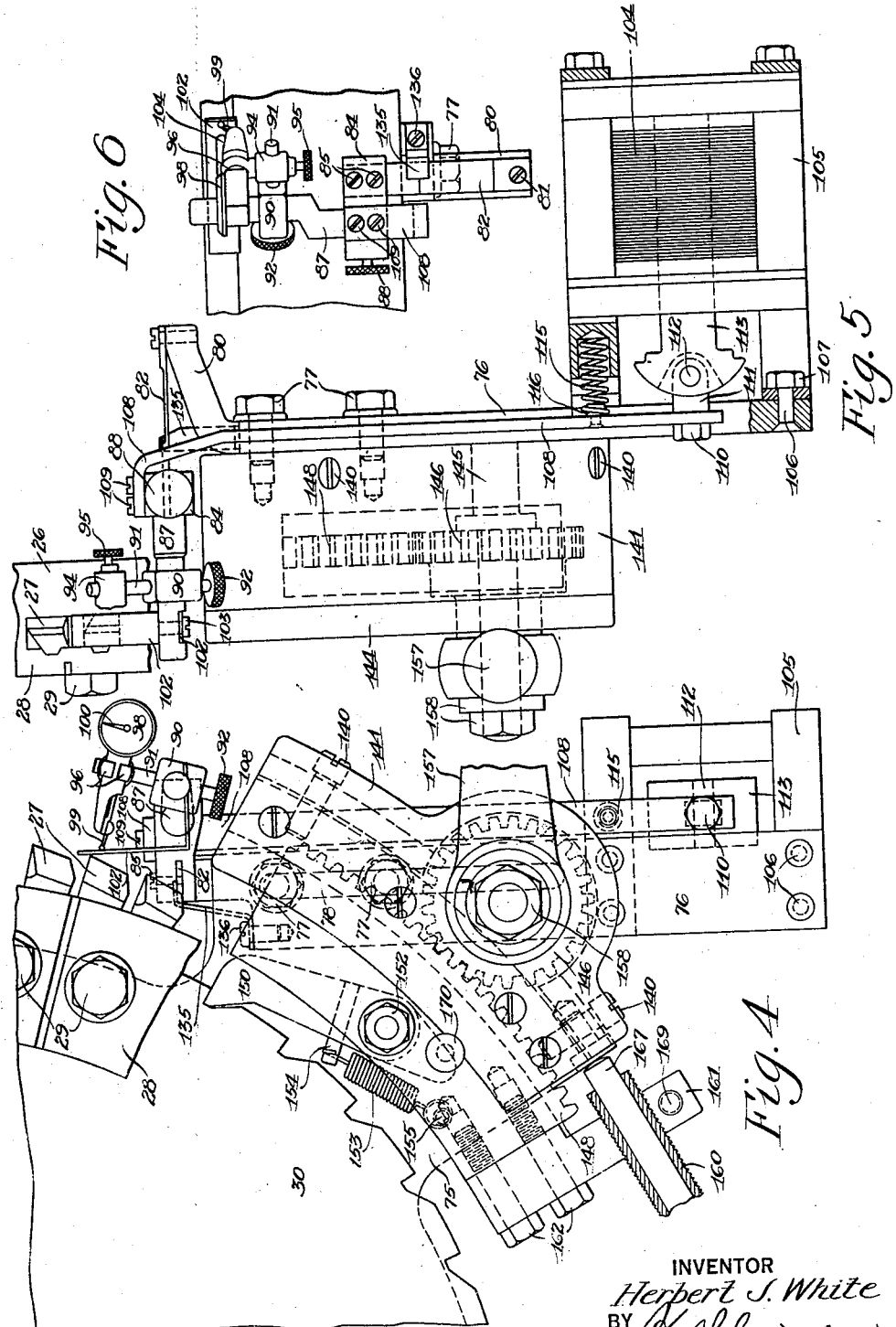

Patented May 17, 1932

1,858,869

UNITED STATES PATENT OFFICE

HERBERT J. WHITE, OF ROCHESTER, NEW YORK, ASSIGNOR TO GLEASON WORKS, OF ROCHESTER, NEW YORK, A CORPORATION OF NEW YORK

CUTTER SHARPENER

Application filed February 14, 1931. Serial No. 515,825.

The present invention relates to machines for sharpening cutting tools and particularly to machines for sharpening rotary gear cutters of the type used on bevel gear roughing machines such as disclosed in Patent No. 1,344.879 issued to James E. Gleason et al. June 29, 1920.

This invention has for its purpose broadly to provide a cutter sharpener on which the sharpening operation can be performed more rapidly and more efficiently and on which cutters can be ground to size with extreme accuracy. More specifically, the present invention has for its object to provide a sharpener in which the extent of the sharpening operation can be observed continuously by the operator so that the cutting tool can be ground correctly and with the least loss of time. Further, this invenion provides a manually operated grinder for sharpening rotary gear cutters of the type above referred to, which is provided with a simple, easily operated and accurate indexing mechanism for bringing the different blades of the cutter successively into sharpening position.

With a machine constructed according to the present invention, stopping of the grinding operation at intervals to gauge the cutter is rendered unnecessary and at the same time the accuracy of the cutter is insured without requiring any extra test after the sharpening operation has been completed. Moreover, what was hitherto an exceedingly laborious task, namely, the moving of the heavy cutter to bring its different blades into sharpening position had been made easy and accurately controllable.

The blades of rotary gear cutting tools have side cutting edges that are inclined to one another in accordance with the pressure angle of the gear to be cut and are relieved back to their cutting edges. Unless the blades are of the correct height, they will cut a slot which is either wider or narrower than the correct width and unless all of the blades are of the same height, some will do more work than others, wearing away more rapidly.

In a machine for sharpening rotary gear cutters, as constructed according to the present preferred embodiment of this invention, the cutter to be sharpened is mounted upon a rotary head or support which is indexable to bring different blades of the cutter successively into position for sharpening; a rotary grinding wheel is used as the sharpening tool and this is mounted on a swingable support that is manually oscillatable to pass the grinding wheel across the face of a cutting blade; and a gauging device is provided which is arranged to be moved automatically into gauging position after each grinding operation on a blade to test the height of the blade being ground. Thus with each passage of the grinding wheel across a blade, the operator can observe the extent of the sharpening operation. When the blade has been ground to the correct height, the cutter support is indexed. Through this process of alternate grinding and testing all of the blades of the cutter can be sharpened to the correct height in a most expeditious and exact manner.

In the drawings:

Figure 2 is a plan view of the cutter support, showing a cutter mounted thereon for sharpening;

Figure 3 is a sectional view on the line 3—3 of Figure 2;

Figure 4 is a fragmentary plan view on an enlarged scale of parts shown in Figure 2;

Figure 5 is a fragmentary side elevation of the parts shown in Figure 4;

Figure 6 is a side view of the gauging device and the support therefor;

Figure 7 is a fragmentary view showing details of the parts which control the operation of the solenoid that governs the movement of the gauging device into and out of gauging position;

Figure 8 is a section on the line 8—8 of Figure 7; and

Figure 9 is a perspective view of one of the blades of the cutter.

Figure 1:
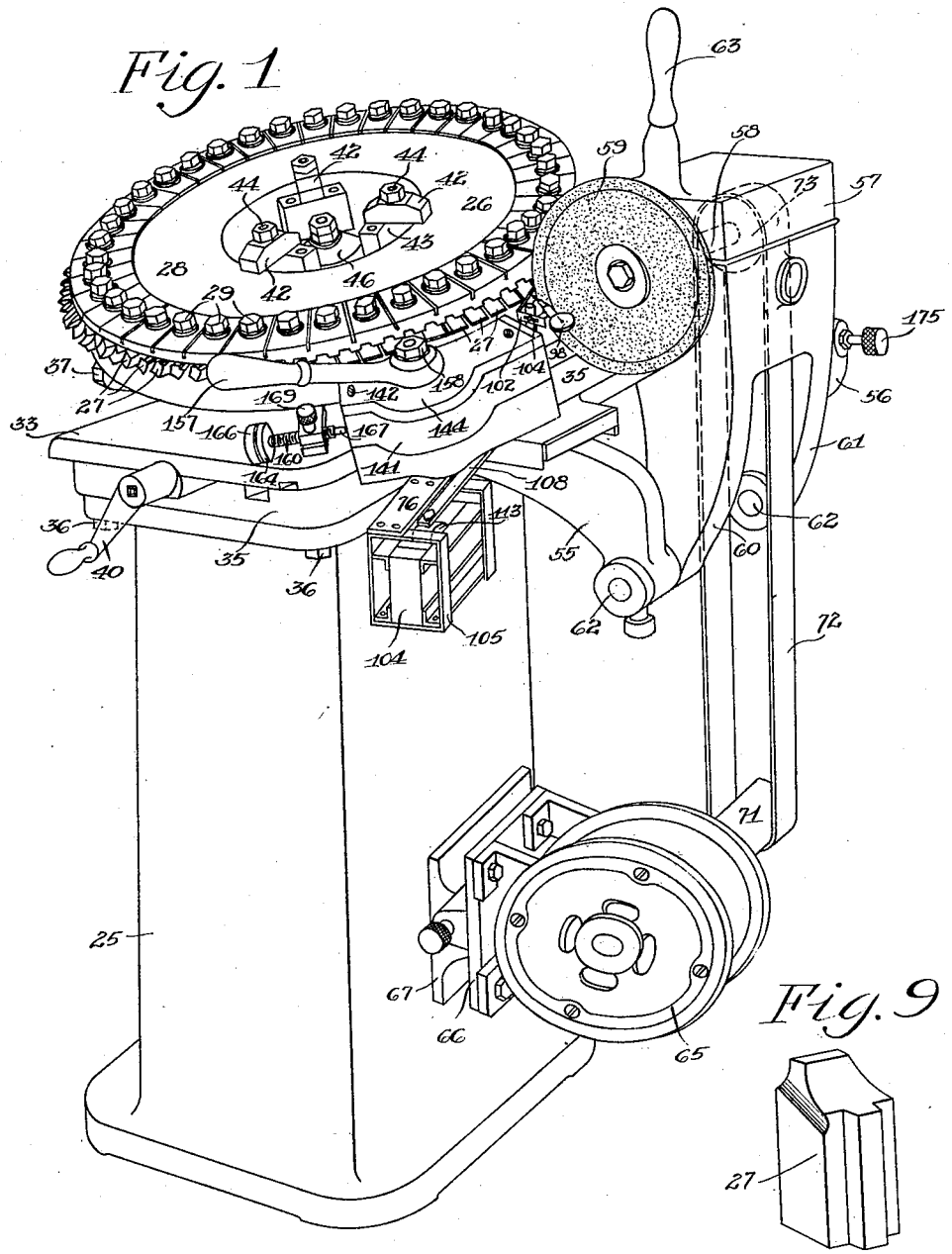
Figure 1 is a perspective view of a sharpener for rotary gear cutters constructed according to a preferred embodiment of this invention.

Referring to the drawings by numerals of reference, 25 designates the base or frame of the machine. 26 designates the cutter which is to be sharpened. The cutter is provided with a plurality of radially arranged cutting blades 27 that are secured in position on the cutter head by a clamping ring 28 which is in turn secured to the cutter head by bolts 29. The blades 27 of the cutter are formed with side faces which converge in the direction of the tips of the blades, and ordinarily the side surfaces of the blades are of curved profile, as clearly shown in Figure 9, to rough teeth on the gear blank of curved profile. The blades are relieved on their sides and tips back of their cutting edges to afford the required cutting clearance. Ordinarily, alternate blades of the cutter head are sharpened with opposite front rake angles to provide opposite side cutting edges which cut opposite sides of the tooth-slots of the gear blank.

The cutter 26 to be sharpened is secured to a ratchet wheel or disc 30 (Figures 2, 3 and 4) and this disc or ratchet wheel 30 is rotatably mounted upon a plate or support 32 that is adjustably mounted on the base or frame 25 of the machine.

The adjustments of the plate 32 upon the base or frame of the machine may be the same as those employed in machines heretofore built for sharpening cutters of the type shown and they form no part of the present invention. Suffice it to say that the plate 32 is pivotally mounted on a slide 33 which is slidably adjustable on a plate 35 that is secured by bolts 36 to the base or frame 25 of the machine. The pivotal adjustment of the plate 32 upon the slide 33 is for the purpose of enabling the cutter to be swung into the two different positions which it has when the opposite side cutting blades of the cutter are being sharpened. The pivot bolt on which the blade 32 swings is shown at 37 in Figure 1. The plate 32 is formed with two ears or lugs 38 (Fig. 3) which engage and rock on this pivot bolt 37. To tilt the cutter to the two opposite positions of its angular adjustments, the plate 32 is simply rocked by hand about the pivot bolt 37. The bolt 37 is secured on the slide 33. The slide 33 is adjustable on the plate 35 by means of a screw (not shown) that is mounted in the plate 35 and engages in a nut (not shown) which is secured to the slide 33. The handcrank 40 (Fig. 1) is for the purpose of operating the screw.

The cutter 26 to be sharpened is clamped rigidly to the disc 30 by the clamp-lugs 42. These lugs rest at one end on blocks 43 which are secured by screws 44 to the disc 30. At their other ends, the lugs 42 engage the upper face of the cutter. The lugs 42 are pulled into clamping position by threading up on the bolts 44 which thread into the disc 30.

The disc 30 is held on the plate 32 against axial movement by the cap 46 and the friction-disc 47 (Fig. 3) which is secured thereto. The cap 46 is held in position by nuts 48 which thread onto the stud 49 that threads into the plate 32. 50 designates a circular key or ring which locates the disc 30 on the plate 32.

At one side of the frame 25 of the machine, there are a pair of projecting arms 55 and 56 (Figs. 1, 7 and 8). 57 designates a swinging support in which the spindle 58 that carries the grinding wheel 59 is journaled. This support 57 is formed with depending arms 60 and 61. These arms carry studs 62 that are journaled in the arms 55 and 56 of the plate 35. The studs 62 are pinned in the arms 60 and 61.

The support 57 is provided with a handle 63 (Fig. 1) by means of which the operator can oscillate the support 57 about the axis of the pivot studs 62 to swing the grinding wheel into and out of grinding position to sharpen the blades of the cutter.

The grinding wheel is driven continuously from a motor 65 (Fig. 1) which is secured to a base 66 that is pivotally mounted on a bracket 67 that is secured at one side of the base or frame 25 of the machine. The grinding wheel spindle 58 is driven from the pulley 71 through the belt 72 and the pulley 73. The pulley 73 is secured to the grinding wheel spindle 58 while the pulley 71 is secured to the armature shaft of the motor 65.

The plate 32 is formed at one side with an extension 75 (Figs. 2, 3 and 4). 76 designates a bar or strap which is adjustably secured to the under face of the extension 75 by means of bolts 77 which pass through an elongated slot 78 in the bar or strap 76. The strap 76 is formed at one end with a downwardly projecting leg 80 (Figs. 5 and 6). Secured to this leg 80 by means of a screw 81 is a strip of spring-steel 82. This strip 82 is made thinner intermediate its ends, as clearly shown in Figure 6, to make it more readily flexible.

At its upper end, the flexible strip 82 fits into a slot formed in a block 84 and is held therein against movement by the set-screws 85.

There is a post 87 which is secured in a recess in the block 84 by means of a set screw 88. The upper end of the post 87 is offset with reference to its lower end, as clearly shown in Figures 5 and 6. A ring-member 90 which is formed with a stud 91 fits on the upper end of the post 87 and is rotatably and vertically adjustable thereon. This ring member is secured in any adjusted position on the post 87 by the set-screw 92. There is a ring-member 94 mounted on the stud 91 for slidable and rotatable adjustment thereon. The ring member 94 can be secured in any adjusted position on the stud 91 by the set screw 95.

The ring member 94 is formed with clamping-jaws 96. 98 designates a dial indicator of known type. The contact finger is indicated at 99. Movement of the finger is registered on the dial by the hand 100. This indicator is held in spring clamp-jaws 96 of the member 94.

102 designates a strap of right angular shape which is adjustably secured in a recess in the post 87 by a screw 103 (Figs. 1 and 5) that passes through a slot 104 in the strap and threads into the post 87. The bar 76, post 87, ring member 90, ring member 94 and the strap 102 are adjusted so that the strap 102 is normally held in position, urged by the spring strip 82, where it will engage the outermost point of that blade 27 which happens to be in sharpening position. The dial indicator is adjusted so that its contact point 99 is in engagement with the strap 102 to register the position of the strap when the same is in engagement with a blade of the cutter.

In the operation of the machine, the operator makes a passage of the grinding wheel across the face of the blade being ground and then swings the wheel out of position. During the passage of the wheel across the face of the blade, the contact strap 102 and the gauging mechanism generally is swung out of position so that it will not interfere with the grinding wheel, but when the wheel is clear of the blade, the flexible steel strip 82 serves to bring the contact strap 102 back into engagement with the blade so that the operator can read from the dial indicator 98 the relative height of the blade and thus observe the progress of the sharpening operation. The mechanism for automatically moving the gauging mechanism out of the way on the inward grinding stroke of the wheel will now be described.

104 designates a solenoid which is carried in a hanger or bracket 105 that is secured by screws 106 and nuts 107 to the strap 76. 108 designates a strap which is bent up at one end and secured by screws 109 to the block 84. At its other end, the strap 108 is connected by a nut 110 to a headed member 111 which is pivotally connected at 112 to the plunger 113 of the solenoid 104. When the solenoid is energized, the plunger 113 is drawn down, pulling the strap 108 down and swinging the block 84 and with it the gauging mechanism mounted thereon out of the way of the grinding wheel. When the solenoid is de-energized, the spring strip 82 returns the gauging mechanism to position to test the height of the blade. The assist the spring strip 82 in returning the gauging mechanism to position, a coil spring 115 is provided. This spring 115 seats in a socket formed in the casing 105 which carries the solenoid and its upper end fits onto the button 116 that is riveted on the lower face of the strap 108.

120 designates an electric switch of usual construction which is secured to a bracket 121 that is fastened adjustably by screws 122 and nuts 123 to the arm 56 of the frame 25 (Figs. 7 and 8). The studs 122 pass through an arcuate slot 124 formed in the bracket 121 and curved about the axis of the stud 62 as a center. 125 designates a stud that is secured by a nut 126 in the arm 61 of the swinging support 57. Keyed to the stud 125 at its outer end is a cam block 128. This cam block 128 is held against a shoulder on the stud 125 by the nut 129 and the lock washer 130.

The switch 120 is a normally open switch. The cam block 128 is so formed, as clearly shown in Figure 7, that as the support 57 is swung inwardly to bring the grinding wheel into engagement with a blade, the roller 132 carried by the switch arm 133 rolls under the cam block 128, depressing the switch arm and closing the circuit to the solenoid 105. This energizes the solenoid and as described already, retracts the gauging mechanism from gauging position. As the support 57 swings outwardly, the switch arm 133 is released, the solenoid 105 is de-energized and the gauging mechanism is returned to gauging position to gauge the height of the blade being ground by the spring strip 82 and spring 115. A clip 135 is provided to limit the inward movement of the spring strip. This clip is secured by screws 136 to the strap 76.

The alternate grinding and gauging proceed until the blade being sharpened is ground back to the proper height. Then the operator indexes the cutter around to bring another blade into position to be sharpened. When the cutter has alternate blades which cut on opposite sides of a tooth slot, it is alternate blades which are successively indexed into position to be sharpened. The indexing mechanism will now be described.

Secured to the extension 75 of the support 32 (Figs. 2, 3, 4 and 5) by screws 140 is a bracket or housing 141. Secured to the bracket or housing 141 by screws 142 is a cover-plate 144. Rotatably mounted in the housing 141 is a stud 145. Keyed to this stud is a spur pinion 146. The upper end of the pinion 146 is of reduced diameter as clearly shown in Figure 3 and passes through an opening in the cover-plate 144. The pinion 146 meshes with a spur gear segment or circular rack 148. The bracket 141 and the cover plate 144 are formed, as clearly shown in Figure 3 with opposed guide-surfaces which together provide a circular guide-way in which the rack member 148 reciprocates and which is curved about the axis of the disc 30 as a center and is of dovetailed shape in cross-section. The spur gear segment or circular rack 148 is shaped, also, so that its axis coincides with the axis of the disc 30.

150 designates a pawl which is pivotally mounted on a stud 151 that is secured by the nut 152 in the circular rack 148. This pawl is adapted to engage with the teeth of the ratchet wheel 30 and is resiliently held in engagement with the ratchet wheel by a coil spring 153 which is secured at one end to a pin 154 that is mounted in the pawl and at its other end to a pin 155 which is secured in the rack member 148.

An operating handle 157 is secured to the upper end of the pinion 146 by nuts 158.

When the hand lever 157 is rotated to the left from the position shown in Figure 1 to that shown in Figure 2, the pinion 146 moves the rack member 148 and with it the pawl 150, advancing the ratchet wheel and thus indexing the cutter head. When the hand lever 157 is swung back to the position shown in Figure 1, the pawl 150 ratchets out of engagement with the tooth of the ratchet wheel with which it has been engaged and is returned to a position where it engages a new tooth of the ratchet wheel ready to advance the ratchet wheel again on another indexing movement. The amount of advance of the ratchet wheel, that is, the extent of the indexing movement, is governed by the adjustment of a stop member 160 that is adjustably threaded into an arm 161 which is secured by screws 162 to the rack member 148. The stop member 160 is formed with an enlarged head 164 which is hollowed out to receive a piston 165. A cap 166 threads onto the head 164 of the stop member forming with the head a closed chamber in which the piston 165 reciprocates. The stem of the stop member 160 is bored to receive the piston rod 167 which is integral with the piston 165. A coil spring 168 which is interposed between the cap member 166 and the piston 164 serves to urge the piston rod 167 outwardly beyond the inner end of the stop member 160.

The piston 164 and piston rod 167 serve as a cushioning device to cushion the shock of stoppage of movement of the rack 148 at the limit of its advancing movement. The chamber in which the piston travels may be filled with oil or a suitable fluid, although ordinarily the spring 168 and the air entrapped in the chamber will serve as a sufficient cushioning medium. The friction-disc 47 (Fig. 3), already referred to, assists also in cushioning the indexing operation, preventing over-running of the ratchet wheel when advanced.

The advancing stroke of the rack member 148 can be adjusted by threading the stop member 160 in the arm 161. This arm 161 is formed at its outer end as a split-clamp and after the screw 160 has been adjusted, it can be securely clamped in adjusted position by threading up on the clamp screw 169.

The return movement of the handle 157 is limited by the pin 170 which is threaded into the rack member 148.

In the use of the machine, the cutter to be sharpened is secured to the ratchet wheel or disc 30 by the clamping lugs 42 and bolts 44. The support 32 is tilted to one side or the other, depending upon which group of side cutting blades of the cutter is to be sharpened first. The slide 35 is then adjusted on the plate 35 to feed one of the blades of the cutter into grinding position. The gauging mechanism is then adjusted into operative position so that the strap 102 will touch the outermost point of that blade 27 which is in position for sharpening. This is done by adjusting the strap 76 on the extension 75 of the plate 32, by adjusting the post 87 angularly in the block 84 and by adjusting the strap 102 on the post 87 toward or from the cutter head. The contact point 99 of the indicator 98 is brought into position to engage the strap 102 by adjustment of the ring member 90 angularly and vertically on the post 87, by adjustment of the ring member 94 angularly and horizontally on the stud 91, and if necessary, by sliding adjustment of the indicator itself in the clamping jaws 96. The stop member 160 is adjusted in the arm 161 to limit the amount of indexing movement of the ratchet wheel 30. There are two stop members 175 and 176 (Figs. 1, 7 and 8) which are threaded into ears 178 formed on the arm 56 of the frame 25. These are adjustable toward or from one another to determine the amount of swinging movement of the oscillatable grinding wheel support 57. These stop members 175 and 176 engage the stud 125 that is secured in the arm 61 of the grinding wheel support 57 and so limit the movement of the grinding wheel support in both directions.

When all of the adjustments described have been made, the machine is ready for the sharpening operation. The operator first starts the motor 65 which drives the grinding wheel through the pulley 71, the belt 72, and pulley 73. Then the operator grasps the handle 63 moving the grinding wheel carrier 57 inwardly to pass the grinding wheel 58 across the face of that cutting blade 27 which is in position for sharpening. As the grinding wheel carrier 57 rocks or swings inwardly, the cam member 128 (Figs. 7 and 8) engages the roller 132 of the switch arm 133, depressing the switch arm and closing the circuit to the solenoid 104, energizing the solenoid to cause the plunger 113 of the same to be drawn downwardly and swing the gauging mechanism out of gauging position against the resistance of the spring strip 82 and the coil spring 115 (Figures 4 and 5). As the grinding wheel is swung across the face of the blade, it grinds the face back. The operator controls the amount of stock he wishes to take off by manipulation of the handle 40. When he swings the wheel out, the roller 132 of the switch arm 133 (Figs. 7 and 8) rides clear of the cam 128, the solenoid 113 is de-energized and the gauging mechanism is thrown back into gauging position by the spring member 82 and the spring 115. The operator observes the indicator 98. If the height of the blade is correct, the operator indexes the cutter head to bring another blade into grinding position. If the height is not correct, he rotates the handle 40 to feed the blade forward and swings the grinding wheel in again to grind off more stock. As the grinding wheel swings in, the gauging mechanism is again withdrawn by energizing of the solenoid 105. As the grinding wheel carrier swings outwardly, the solenoid 105 is again de-energized and the gauging mechanism again moved into position so that the operator can observe the extent of the sharpening operation. The alternate grinding and gauging proceeds until the blade has been ground back to a satisfactory height. Then the operator grasps the handle 157, rotating the pinion 146 to move the rack member 148 and with it the pawl 150 to index the cutter to bring another blade of the cutter into grinding position. The grinding of this blade proceeds as before. When this blade has been ground to the correct height, another blade is indexed into position and so the operator proceeds until all of the blades which cut one side of a tooth have been ground. Then the operator swings the cutter support 32 to its other limit position and the opposite side-cutting blades of the cutter are sharpened.

While the invention has been illustrated in connection with the sharpening of a particular type of cutter and in a particular manner, it will be understood that in its broadest aspects, the invention is not limited to this particular use or construction. This application is intended to cover any adaptations, uses, or embodiments of the invention, following, in general the principles of the invention and including such departures from the present disclosure as come within known or customary practise in the art to which the invention pertains and as may be applied to the essential features hereinbefore set forth and as fall within the scope of the invention or the limits of the appended claims.

Having thus described my invention what I claim is:

1. In a machine for sharpening cutters, a frame, a pair of supports mounted on the frame, one of which is adapted to carry the cutter to be sharpened and the other of which is adapted to carry a rotary grinding wheel, a grinding wheel journaled in the latter support, one of said supports being movable toward and from the other to move the grinding wheel into and out of engagement with the cutter to be sharpened, a gauging device mounted on the frame for movement into and out of gauging position with reference to the cutter, and means operative to cause the movements of the gauging device to alternate with those of the grinding wheel.

2. In a machine for sharpening cutters, a frame, a support mounted on the frame and adapted to carry the cutter to be sharpened, a second support mounted on the frame for movement toward and from the first support, a grinding wheel journaled in the second support, a gauging device, and means connecting the second support with the gauging device for moving the grinding wheel and gauging device alternately with one another into and out of operative positions.

3. In a machine for sharpening cutters, a frame, a pair of supports mounted on the frame, one of which is adapted to carry the cutter to be sharpened and the other of which is adapted to carry a rotary grinding wheel, a grinding wheel journaled in the latter support, one of said supports being movable toward and from the other to move the grinding wheel into and out of engagement with the cutter to be sharpened, a gauging device mounted on the frame, means normally urging the gauging device into operative position with relation to the cutter, and means operative on movement of the movable support toward the other support to withdraw the gauging device from operative position.

4. In a machine for sharpening cutters, a frame, a support mounted on the frame and adapted to carry the cutter to be sharpened, a second support mounted on the frame for movement toward and from the first support, a grinding wheel journaled in the second support, a gauging device, and means operated by movement of the second support toward and from the first support to move the gauging device out of and into gauging position, respectively.

5. In a machine for sharpening cutters, a frame, a support rotatably mounted on the frame and adapted to carry the cutter to be sharpened, a second support oscillatably mounted on the frame, a grinding wheel journaled in the second support, a gauging device movably mounted on the frame, means operative to cause the grinding wheel and gauging device to be moved alternately with one another into and out of operative position, and means for indexing the cutter support.

6. In a machine for sharpening cutters, a frame, a support rotatably mounted on the frame and adapted to carry the cutter to be sharpened, a second support oscillatably mounted on the frame, a grinding wheel journaled in the second support, a gauging device movably mounted on the frame, means normally urging the gauging device into operative position, means operative on movement of the grinding wheel into grinding position to withdraw the gauging device from operative position, and means for indexing the cutter support.

7. In a machine for sharpening cutters, a frame, a support rotatably mounted on the frame and adapted to carry the cutter to be sharpened, a second support oscillatably mounted on the frame, a grinding wheel journaled in the second support, a gauging device mounted on the frame, means operated by movement of the grinding wheel support into and out of operative position, respectively, for moving the gauging device, respectively, out of and into operative position, and means for indexing the cutter support.

8. In a machine for sharpening cutters, a frame, a support rotatably mounted on the frame and adapted to carry the cutter to be sharpened, a second support oscillatably mounted on the frame, a grinding wheel journaled in the second support, a gauging device, a bracket on which the gauging device is mounted, said bracket being movably mounted on the frame to carry the gauging device into and out of gauging position, means normally urging the bracket in one direction, an electrically operated means operated by movement of the grinding wheel support for moving the bracket in the opposite direction.

9. In a machine for sharpening cutters, a frame, a support rotatably mounted on the frame and adapted to carry the cutter to be sharpened, a second support oscillatably mounted on the frame, a grinding wheel journaled in the second support, a gauging device, a bracket movably mounted on the frame and on which said gauging device is mounted, a solenoid operatively connected with said bracket, and means operative on movement of the wheel support respectively toward and from the cutter support to energize and de-energize the solenoid to move the gauging device out of and into gauging position.

10. In a machine for sharpening cutters, a frame, a support rotatably mounted on the frame and adapted to carry the cutter to be sharpened, a second support oscillatably mounted on the frame, a grinding wheel journaled in the second support, a gauging device, a bracket on which the gauging device is mounted, said bracket being movably mounted on the frame to carry the gauging device into and out of gauging position, means normally urging the bracket in one direction, a solenoid operative to move the bracket in the opposite direction, and co-operating means on the frame and the wheel support for energizing the solenoid on movement of the wheel support in one direction.

11. In a machine for sharpening cutters, a frame, a support rotatably mounted on the frame and adapted to carry the cutter to be sharpened, a second support oscillatably mounted on the frame, a grinding wheel journaled in the second support, a gauging device, a bracket on which the gauging device is mounted, said bracket being movably mounted on the frame to carry the gauging device into and out of gauging position, means normally urging the bracket in one direction, a solenoid operative to move the bracket in opposite direction, a cam and an electric switch, one of which is mounted on the frame and the other on the wheel support, said electric switch being operatively connected with the solenoid whereby on movement of the wheel support in one direction, said switch is brought into operative engagement with said cam to operate said solenoid.

12. In a machine for sharpening cutters, a frame, a support rotatably mounted on the frame and adapted to carry the cutter to be sharpened, a second support oscillatably mounted on the frame, a grinding wheel journaled in the second support, and means for indexing the cutter support to bring different blades of the cutter successively into position for sharpening comprising a ratchet wheel secured to the first support, a pawl, means resiliently holding the pawl in engagement with the ratchet wheel, and means for oscillating the pawl about the axis of the cutter support to ratchet the ratchet wheel forward.

13. In a machine for sharpening cutters, a frame, a support rotatably mounted on the frame and adapted to carry the cutter to be sharpened, a second support oscillatably mounted on the frame, a grinding wheel journaled in the second support, and means for indexing the cutter support to bring different blades of the cutter successively into position for sharpening comprising a ratchet wheel secured to the first support, a pawl, a slide reciprocably mounted on the frame and on which the pawl is pivotally mounted, means for resiliently holding the pawl in engagement with the ratchet wheel, and means for reciprocating said slide to advance the ratchet wheel comprising a rack secured to the slide, and a pinion meshing with said rack.

14. In a machine for sharpening cutters, a frame, a support mounted on the frame and adapted to carry the cutter to be sharpened, a rotary grinding wheel, a support for the grinding wheel mounted on the frame and reciprocable thereon to effect the grinding operation, and means for automatically gauging the cutter after each complete passage of the grinding wheel.

15. In a machine for sharpening gear cutters having a plurality of peripherally arranged cutting blades, a support mounted on the frame and adapted to carry the cutter to be sharpened, a rotary grinding wheel, a support for the grinding wheel mounted on the frame and reciprocable thereon to pass the grinding wheel across the face of the blades of the cutter, and means for automatically gauging the height of a blade of the cutter after each complete passage of the grinding wheel across the face of the blade, said cutter support being rotatably mounted on the frame to permit indexing the cutter around to grind the different blades.

16. In a machine for sharpening rotatable gear cutters having a plurality of peripherally arranged cutting blades, a support rotatably mounted on the frame and adapted to carry the cutter to be sharpened, a rotary grinding wheel, a support for the grinding wheel mounted on the frame and oscillatable thereon to pass the grinding wheel across the face of the blades of the cutter, means for automatically gauging the height of a blade of the cutter after each complete passage of the grinding wheel across the face of the blade, and means for indexing the cutter support to bring the different blades of the cutter successively into grinding position.

HERBERT J. WHITE.